Oct. 16, 1962  D. G. POSSON  3,058,712
ADAPTOR FOR WHEEL BALANCING DEVICE
Filed Feb. 15, 1960  2 Sheets-Sheet 2

Inventor:
Donald G. Posson,
by Arthur D Thomson
Attorney

United States Patent Office 3,058,712
Patented Oct. 16, 1962

3,058,712
ADAPTOR FOR WHEEL BALANCING DEVICE
Donald G. Posson, Needham, Mass., assignor of one-half to Rocco D. La Penta, Dover, Mass.
Filed Feb. 15, 1960, Ser. No. 8,845
5 Claims. (Cl. 248—205)

This invention relates to wheel balancing devices, such as those used for determining the correct position for placement of weights to achieve dynamic balance of a wheel, and more particularly to adaptors for mounting such a device on an automobile wheel.

Various wheel balancing devices are now in use for determining the dynamic balance of automobile wheels. These devices are mounted on or connected to the wheel and give an indication, while the wheel is turning, of the location and size of weights which should be added to the wheel for dynamic balance. Wheel balancing devices are ordinarily mounted by means of connectors which engage the rim of the wheel. This type of mounting does not provide accurate alignment of the device with the center of the axle, and accordingly produces errors in the readings of the device. Furthermore, the wheel is run at high speeds, up to 1000 r.p.m. for example, while the balancing tests are being made. Many of the present mountings are insecure, and the balancing device is likely to fly off and injure the mechanic making the test.

The principal object of this invention is to provide an adaptor suitable for attaching a wheel balancing device to an automobile wheel, which adaptor accurately centers the balancing device on the center of rotation of the wheel and secures the device in a positive manner so that it cannot fall off accidentally. Another object is to provide a simple mounting means which may be used with various kinds of balancing devices.

The preferred form of adaptor consists in general of a cap which is permanently attached to the balancing device, a hub to which the cap is removably clamped, and a pair of nuts which attach the hub to the axle of the automobile wheel. One of the nuts, called the axle nut, has a tubular portion which is threaded on to the axle in place of the usual hub nut of the wheel, and an externally threaded extension. The tubular portion receives the inner race of a ball bearing which is mounted in the adaptor hub. The second nut screws on to the first and bears on the inner race to hold the adaptor hub in place. The adaptor has an external groove in which clamping screws mounted in the cap are received. The inner end of the cap is recessed to receive the wheel hub and is secured to the wheel hub by means of a set screw. The cap and adaptor hub turn with the wheel, while the nuts remain stationary on the axle.

In the drawings illustrating the invention:

Figure 1:
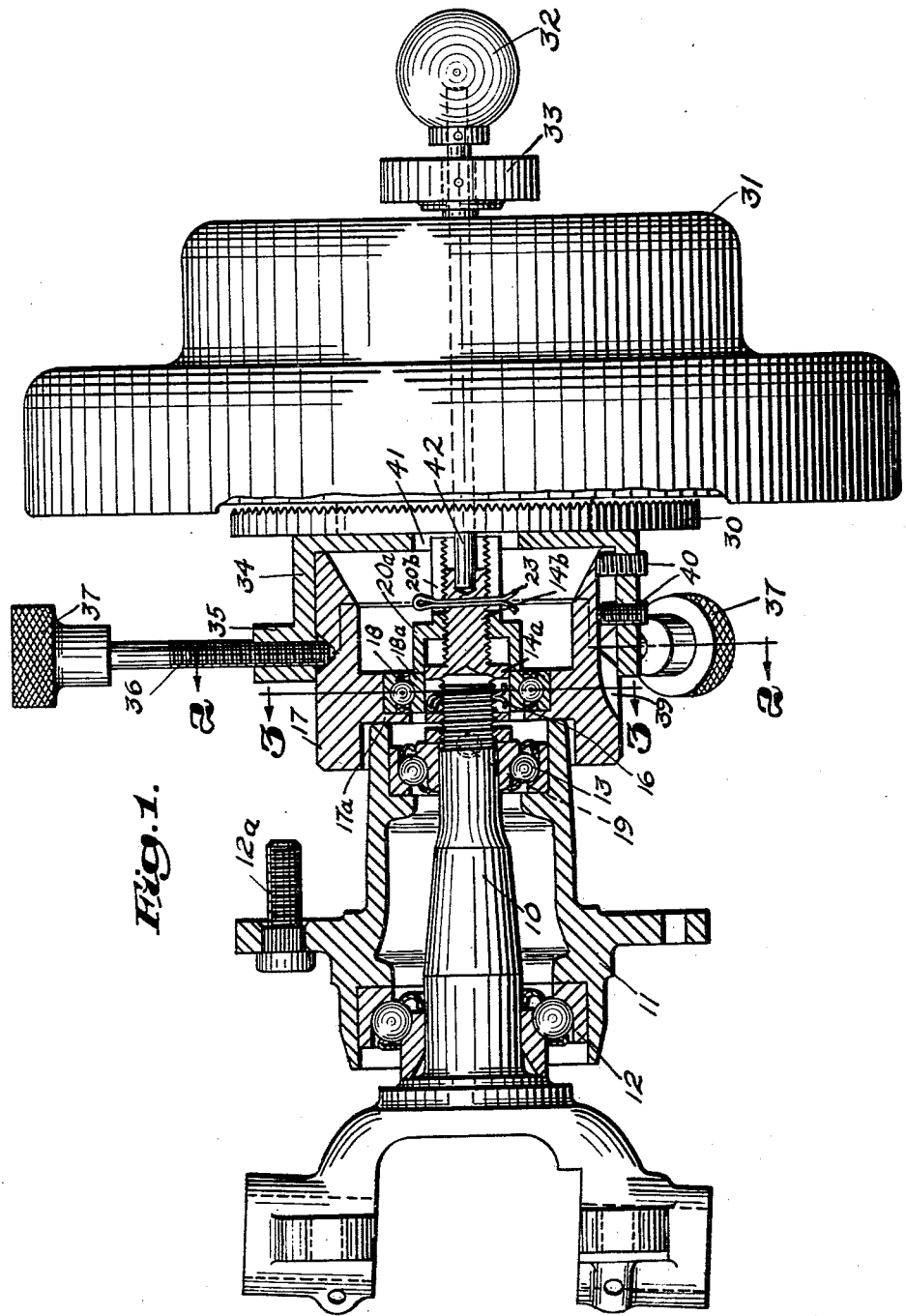
FIG. 1 is a vertical cross-section of an adaptor constructed according to the invention, shown as used to mount a wheel balancing device on an automobile wheel.
Figure 2:
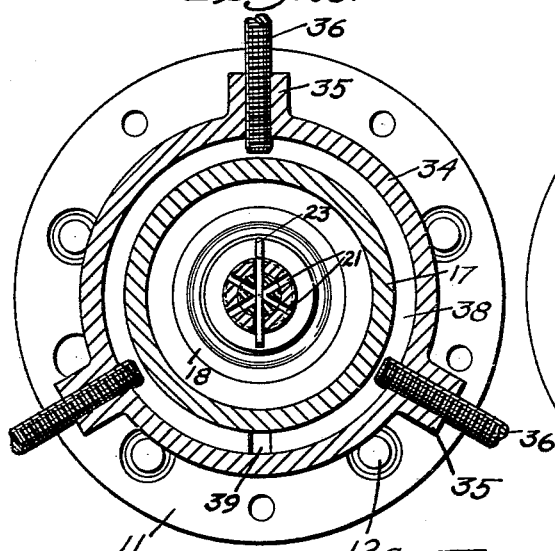
FIG. 2 is a cross-section, somewhat enlarged, taken along line 2—2 of FIG. 1.
Figure 3:
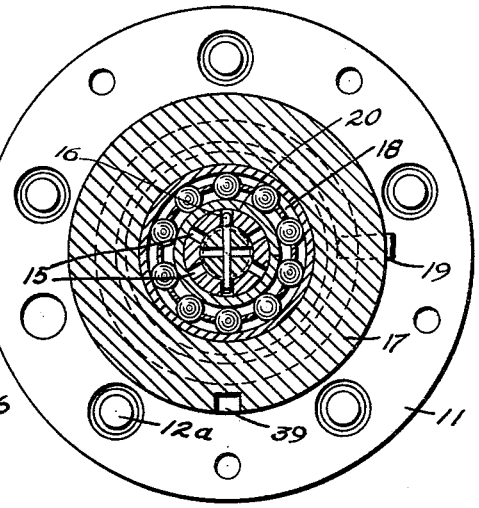
FIG. 3 is a cross-section, somewhat enlarged, taken along line 3—3 of FIG. 1.
Figure 4:
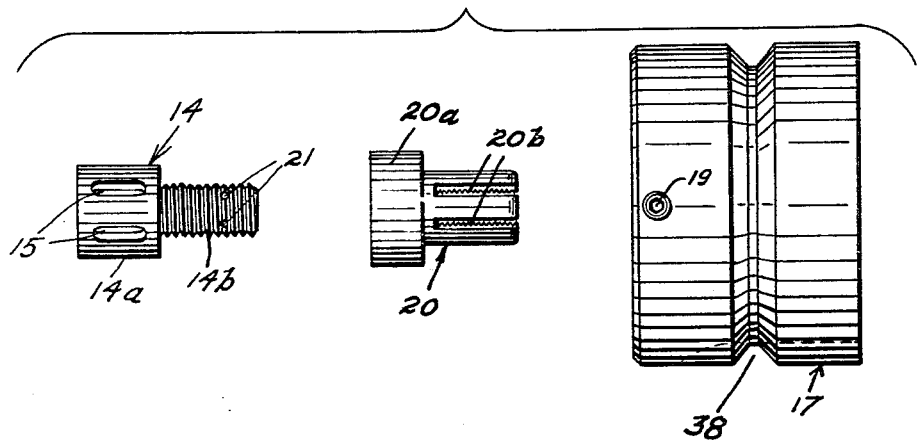
FIG. 4 is an exploded view of the adaptor hub, and axle and hub nuts.

In FIG. 1 the adaptor is shown as mounted on an automobile wheel and axle assembly having an axle 10 and a wheel hub 11 running on bearings 12 and 13 on the axle. It is understood that the automobile wheel (not shown) is mounted on hub 11 and secured by means of bolts 12a in the conventional manner. The usual hub cap or dust cap of the wheel is removed to permit the balancing device to be attached. The hub nut of the wheel is here replaced by the hub nut 14 of the adaptor. This nut has an internally threaded cylindrical portion 14a, which is screwed on to the outer end of axle 10, and a reduced externally threaded portion 14b. Portion 14a has a number of longitudinal slots 15 disposed in opposite radial pairs. One pair of these slots can be aligned with the hole ordinarily provided in the axle for receiving a cotter pin. A cotter pin 16 is passed through the aligned pair of slots 15 and prevents nut 14 from loosening on the axle.

The adaptor hub 17 is generally tubular and has an internal flange 17a, which bears on the outer end of hub 11 and in which a ball bearing 18 is mounted. The inner race 18a of this bearing is of a close sliding fit around tubular portion 14a of nut 14. The inner end of hub 17 surrounds the outer end of hub 11 and the adaptor hub is secured to hub 11 by a set screw 19.

The adaptor hub nut 20 has a tubular inner portion 20a, which is of suitable internal diameter to slide over portion 14a of nut 14 and bears on the inner race 18a of bearing 18, and a reduced outer portion 20b which is threaded to receive portion 14b of nut 14. Nut 14 has a pair of holes 21 in portion 14a, and nut 20 has a number of pairs of radial slots 22, one pair of which may be aligned with one of the holes 21 to permit insertion of a cotter pin 23.

The wheel balancing device is of any conventional type employing a crown gear 30 which is normally mounted to rotate with the wheel, a casing 31 containing various mechanisms which cooperate with the gear, and actuating knobs 32 and 33 which are used to shift a pair of weights within the casing to balance the wheel and give indications of the proper position for weighting the rim of the wheel. To mount such a device for use, the crown gear must be mounted to rotate concentrically with the wheel.

The adaptor includes a tubular cap 34 which is permanently mounted on the back of gear 30. This cap is of an internal diameter to have a close sliding fit with the adaptor hub 17, and has three bosses 35 which are threaded to receive set screws 36 having knurled knobs 37. Adaptor hub 17 has a V-shaped circumferential groove 38 in which the inner ends of screws are engaged. This hub also has a keyway 39 in which a pair of set screws 40 threaded into the cap are received. Cap 34 has a central hole 41 to provide clearance around the adaptor hub nut 20 which remains stationary with the axle of the wheel. As the balancing device has a shaft 42, the inner end of which normally projects through gear 30, nut 20 is bored out to clear the shaft.

When a balancing device is mounted by means of this adaptor, true concentricity with the axle is assured because the mounting device is supported directly on the axle instead of from the rim or some part of the wheel. The nuts 14 and 20, when secured by their cotter pins cannot back off and provide a positive mechanical connection between adaptor hub 17 and the axle. Likewise cap 34 has a positive connection to hub 17, both in the axial and in the radial direction. Therefore the balancing device cannot fall off or slip while the test is being run. The adaptor thus provides a mounting which is entirely safe and which ensures accurate results in the use of the balancing device.

What is claimed is:

1. The combination of a wheel balance testing device and an adaptor for mounting said device on a wheel having a stationary axle and a hub rotatable on the axle, comprising a generally cylindrical adaptor hub detachably secured to the wheel hub, means securing said adaptor hub concentrically to the axle and preventing movement of the adaptor hub in the axial direction of the axle while permitting rotation of said adaptor hub about the axle, a tubular cap attached to said testing device and fitting slidably about said adaptor hub, and means securing said cap to said adaptor hub.

2. The combination of a wheel balance testing device and an adaptor for mounting said device on a wheel having a stationary axle and a hub rotatable on the axle, comprising a generally cylindrical adaptor hub detachably secured to the wheel hub, means securing said adaptor hub concentrically to the axle and preventing movement of the adaptor hub in the axial direction of the axle while permitting rotation of said adaptor hub about the axle, a tubular cap attached to said testing device and fitting slidably about said adaptor hub, and a plurality of screws radially disposed and threadably engaged in said cap, said adaptor hub having a circumferential groove in which said screws are received.

3. The combination described in claim 2, said adaptor hub having an axial groove and said cap carrying an internal projection engaged in said axial groove.

4. An adaptor for mounting a wheel balance testing device on a wheel having a stationary axle and a hub rotatable on the axle comprising a first nut secured to said axle, said nut having a cylindrical portion and a reduced threaded portion, an adaptor hub detachably engaged with said wheel hub, a bearing mounted in said adaptor hub and having an inner race engaging the cylindrical portion of said nut and concentric with said axle, said adaptor hub being rotatable about said race, a second nut threadably engaging the threaded portion of said first nut and bearing on said race to secure said hub adaptor against axial movement with respect to the axle, and means detachably securing said testing device to said adapter hub.

5. An adaptor as described in claim 4, said nuts each having a plurality of transverse openings alignable in various positions and adapted to receive a cotter pin.

References Cited in the file of this patent
UNITED STATES PATENTS

| | | |
|---|---|---|
| 1,067,430 | Jeffery | July 15, 1913 |
| 2,666,610 | Nerman | Jan. 19, 1954 |
| 2,866,673 | Van Der Knoop | Dec. 30, 1958 |